United States Patent
Bahukudumbi (10) Patent No.: US 8,298,969 B2
(45) Date of Patent: Oct. 30, 2012

(54) MULTI-LAYER COMPOSITE MATERIAL

(75) Inventor: Pradip Bahukudumbi, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 547 days.

(21) Appl. No.: 12/583,352

(22) Filed: Aug. 19, 2009

(65) Prior Publication Data

US 2011/0045724 A1 Feb. 24, 2011

(51) Int. Cl.
*B32B 5/26* (2006.01)
*B32B 27/36* (2006.01)
*D04H 1/54* (2012.01)

(52) U.S. Cl. ........ 442/281; 442/277; 442/409; 442/411; 442/414; 442/415; 428/902

(58) Field of Classification Search ............... 428/902; 442/381, 389, 390, 409, 411, 414, 415, 416, 442/301, 268, 277, 278, 280, 281, 284
See application file for complete search history.

(56) References Cited

U.S. PATENT DOCUMENTS

| | | | |
|---|---|---|---|
| 7,060,217 B2 | 6/2006 | Dunton et al. | 264/299 |
| 7,244,501 B2 | 7/2007 | Raghavendran et al. | 428/412 |
| 2007/0066176 A1 | 3/2007 | Wenstrup | 442/415 |
| 2007/0269644 A1 | 11/2007 | Harper et al. | 428/292.1 |
| 2007/0269645 A1 | 11/2007 | Raghavendran et al. | 428/292.1 |
| 2009/0117801 A1 | 5/2009 | Flack | 442/268 |
| 2009/0155522 A1 | 6/2009 | Raghavendran et al. | 428/113 |
| 2010/0285101 A1 | 11/2010 | Moore et al. | 424/445 |

FOREIGN PATENT DOCUMENTS

| | | |
|---|---|---|
| DE | 195 31 001 | 2/1997 |
| EP | 1 737 650 | 7/2009 |
| WO | WO 2005/070664 | 8/2005 |
| WO | WO 2011/075619 | 6/2011 |

OTHER PUBLICATIONS

Patent Cooperation Treaty PCT International Search Report. Date of Mailing, Oct. 25, 2010, International Application No. PCT/US2010/002050, International Filing Date, Jul. 21, 2010.

*Primary Examiner* — Jenna Johnson
(74) *Attorney, Agent, or Firm* — Cheryl J. Brickey (57) ABSTRACT

A composite having a first layer and a second layer. The first layer is a nonwoven layer containing high modulus fibers having a modulus of at least 8 GPa and thermoplastic binder fibers, where at least a portion of the high modulus fibers are connected to the binder fibers, and where the first layer has a solidity of between about 10 and 90%. The second layer is a textile layer selected from the group consisting of a knit layer, a woven layer, bidirectional laminates, and a unidirectional layer. The second layer contains high modulus fibers having a modulus of at least 8 GPa in a thermoplastic matrix.

22 Claims, 6 Drawing Sheets

MULTI-LAYER COMPOSITE MATERIAL

BACKGROUND

The present invention generally relates to composite materials, and in particular, to composite materials having two or more layers of high modulus fiber layers.

There is significant interest in the development of light-weight, durable and inexpensive structural composites suitable for use in various applications, such as truck trailer floor and side panels, automotive interior components, residential and commercial building materials, and so on. Sandwich composite materials containing thin, high strength skins adhesively bonded to a thicker, lightweight core material are generally used. The core material should be sufficiently stiff, have good shear properties, be capable of distributing loads over a large area, and provide good adhesion to the skin layers adjoining it.

The skin materials are typically formed of a fiberglass reinforced plastic. Honeycomb structures have been a commonly used core material as they provide exceptional specific rigidity. However, honeycomb core materials do not provide a full surface for lamination and are prone to delamination, face buckling or catastrophic failure. Also, sandwich composite structures containing honeycomb cores may have difficulties being molded into complex three-dimensional geometries.

Thus there is a need for a light-weight, stiff, energy absorbing and moldable core material for sandwich panel composites. The fibrous composite core material described in this invention can be molded into complex three dimensional shapes in addition to providing a full surface for lamination and fastener applications.

BRIEF DESCRIPTION OF THE FIGURES

An embodiment of the present invention will now be described by way of example, with reference to the accompanying drawings.

DETAILED DESCRIPTION

Figure 1:
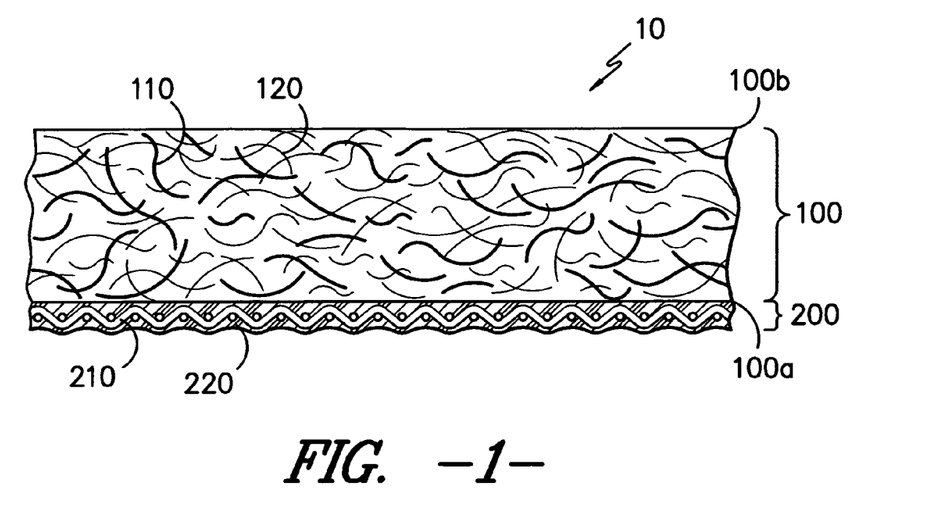
FIG. 1 is a schematic side view of one embodiment of the composite.

Referring now to FIG. 1, there is shown one embodiment of the multi-layered composite material 10. The composite material 10 contains a first layer 100 and a second layer 200. The first layer 100 is a nonwoven layer containing high modulus fibers 110 and thermoplastic binder fibers 120. The second layer 200 contains high modulus fibers 210 in a woven layer in a thermoplastic matrix 220. The second layer 200 is located on the upper surface 100a of the first layer 100. The combination of a low density, fibrous core material as described in the first layer 100 and a high strength skin material as described in the second layer 200 results in a composite material with a very high stiffness to weight ratio and superior load bearing capability.

"Nonwoven", in this application, is defined to be structures incorporating a mass of staple fibers or continuous filament fibers that are entangled and/or heat fused so as to provide a coordinated structure with a degree of internal coherency. Non-woven fabrics may be formed from many processes such as for example, meltspun processes, hydroentangling processes, bonded carded web processes, mechanically entangled processes and the like. "Fiber", in this application, is defined to include a monofilament elongated body, a multifilament elongated body, ribbon, strip, fiber, tape, and the like. The term yarn includes a plurality of any one or combination of the above. The fibers may be continuous or staple length. The fibers may have any suitable cross-section including but not limited to circular, elliptical, regular or irregular, tape, rectangular, and multi-lobal.

The first layer 100 has a solidity of between about 10 and 90%, more preferably between about 15 and 40%. "Solidity" is a nonwoven web property inversely related to density and characteristic of web permeability and porosity (low solidity corresponds to high permeability), and is defined by the equation:

$$\text{Solidity}(\%) = [3.937 * \text{Areal weight}(g/m^2)] / [\text{Thickness (mils)} * \text{Density}(g/cm^3)]$$

In one embodiment, the first layer 100 contains between about 20 and 80% by weight high modulus fibers 110 and between about 20 and 80% by weight binder fibers 120. More preferred, the first layer 100 contains between about 35 and 65% by weight high modulus fibers 110 and between about 35 and 65% by weight binder fibers 120.

The first layer 100 is shown in FIG. 1 with the high modulus fibers 110 and the binder fibers 120 being dispersed equally throughout the layer thickness (between 100a and 100b). FIGS. 2 through 5 illustrate alternative fiber configurations within the first layer 100.

Figure 2:
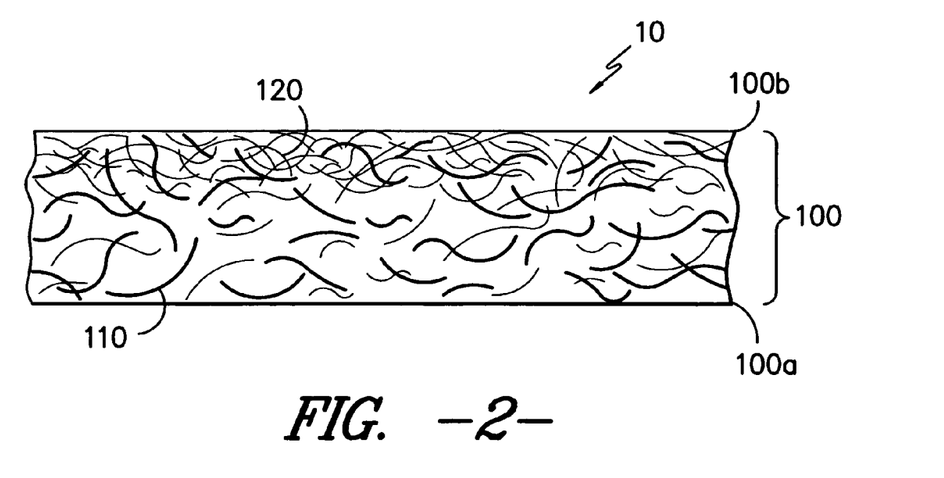
FIGS. 2-5 are schematic side views of the first layer of the composite.

FIG. 2 illustrates the first layer 100 having the binder fibers 120 in a concentration gradient in the thickness of the layer, where the concentration of the binder fibers 120 is greatest by the lower surface 100b of the first layer 100 and decreases in a concentration gradient moving through the layer to the upper surface 100a. The high modulus fibers 110 are distributed approximately evenly through the thickness of the layer. The first layer 100 is a unitary material even if it has gradients in at least some of the fibers, meaning that there are not discrete separate layers joined together but that the first layer 100 is a single layer. In one embodiment, the first layer has a first planar zone defined by a first boundary plane (upper surface 100a) and an inner boundary plane, the first planar zone including a portion of the binder fibers and the high modulus fibers and a second planar zone defined by a second boundary plane (lower surface 100b) and the inner boundary plane, the bulking planar zone including a portion of the binder fibers and the high modulus fibers, where concentrations of the binder fibers in the second planar zone being greater than concentrations of the binder fibers in the first planar zone, and the concentration of the binder fibers decreases in a gradient from the second boundary plane to the inner boundary plane.

Figure 3:
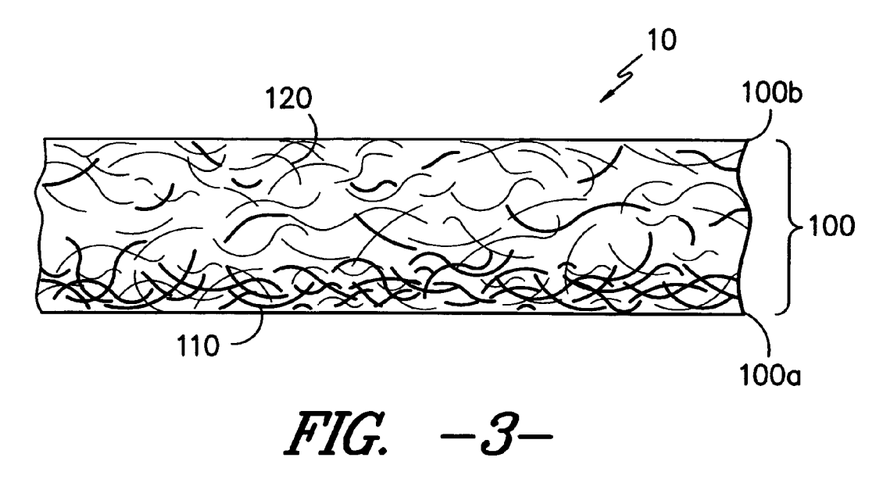

FIG. 3 illustrates the first layer 100 having the high modulus fibers 110 in a concentration gradient in the thickness of the layer 100, where the concentration of the high modulus fibers 110 is greatest by the upper surface 100a of the first layer 100 and decreases in concentration gradient moving through the layer to the lower surface 100b. The binder fibers 120 are distributed approximately evenly through the thickness of the layer. In one embodiment, the first layer has a first planar zone defined by a first boundary plane (upper surface 100a) and an inner boundary plane, the first planar zone including a portion of the binder fibers and the high modulus fibers and a second planar zone defined by a second boundary plane (lower surface 100b) and the inner boundary plane, the bulking planar zone including a portion of the binder fibers and the high modulus fibers, where concentrations of the high modulus fibers in the first planar zone being greater than concentrations of the high modulus fibers in the second planar zone, and the concentration of the high modulus fibers decreases in a gradient from the first boundary plane to the inner boundary plane.

Figure 4:
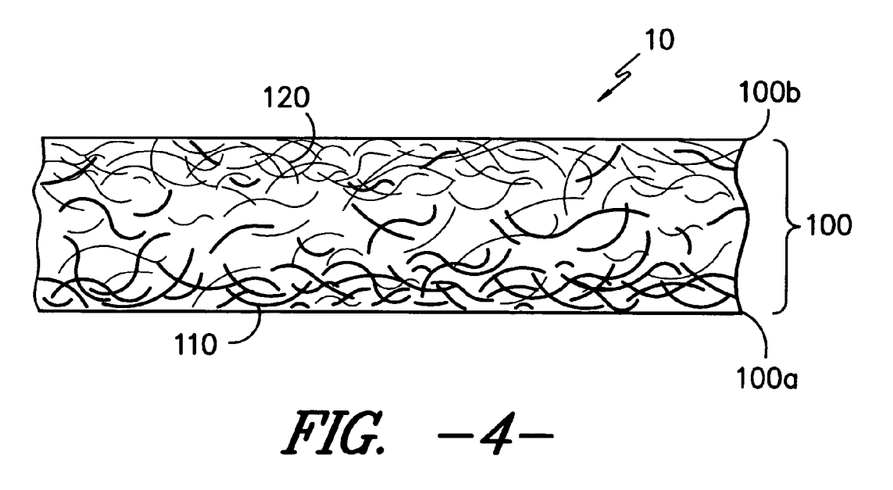

FIG. 4 illustrates the first layer 100 having both the high modulus fibers 110 and the binder fibers 120 in a concentration gradient in the thickness of the layer. The concentration of the binder fibers 120 is greatest by the lower surface 100b of the first layer 100 and decreases in concentration moving through the layer to the upper surface 100a and the concentration of the high modulus fibers 110 is greatest by the upper surface 100a of the first layer 100 and decreases in concentration moving through the layer to the lower surface 100b. In one embodiment, the first layer has a first planar zone defined by a first boundary plane (upper surface 100a) and an inner boundary plane, the first planar zone including a portion of the binder fibers and the high modulus fibers and a second planar zone defined by a second boundary plane (lower surface 100b) and the inner boundary plane, the bulking planar zone including a portion of the binder fibers and the high modulus fibers, where concentrations of the high modulus fibers in the first planar zone being greater than concentrations of the high modulus fibers in the second planar zone, and the concentration of the high modulus fibers decreases in a gradient from the first boundary plane to the inner boundary plane. Additionally, concentrations of the binder fibers in the second planar zone being greater than concentrations of the binder fibers in the first planar zone, and the concentration of the binder fibers decreases in a gradient from the second boundary plane to the inner boundary plane.

Figure 5:
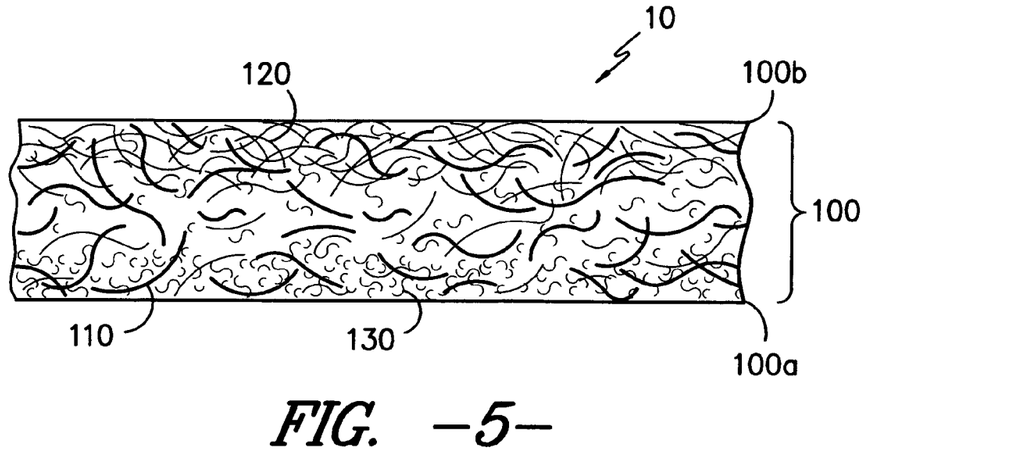

In one embodiment, as shown in FIG. 5, there may be a third fiber 130 which would typically be an additional binder fiber. FIG. 5 illustrates the first layer 100 having both the binder fibers 120 and the third fibers 130 in a concentration gradient in the thickness of the layer. The concentration of the binder fibers 120 is greatest by the lower surface 100b of the first layer 100 and decreases in concentration moving through the layer to the upper surface 100a and the concentration of the third fibers 130 is greatest by the upper surface 100a of the first layer 100 and decreases in concentration moving through the layer to the lower surface 100b. Though in FIG. 5, the high modulus fibers 110 are distributed approximately evenly through the thickness of the layer, in another embodiment they may also be in the gradient in the thickness of the layer. Having third fibers 130 in a gradient may be advantageous to have different binder chemistries at the upper and lower surfaces of the first layer 100 to better facilitate adhesion between the first layer 100 and additional layers that are adhered to the first layer 100.

The high modulus fibers 110 of the first layer 100 may be any suitable fiber having a modulus of at least about 8 GPa, more preferably greater than at least 15 GPa, more preferably greater than at least 70 GPa. The high modulus fibers 110 of the first layer 100 may be staple or continuous. Some examples of suitable fibers include glass fibers, aramid fibers, and highly oriented polypropylene fibers as described in U.S. Pat. No. 7,300,691 by Eleazer et al. (herein incorporated by reference), bast fibers, and carbon fibers. A non-inclusive listing of suitable fibers for the high modulus fibers 110 of the first layer 100 include, fibers made from highly oriented polymers, such as gel-spun ultrahigh molecular weight polyethylene fibers (e.g., SPECTRA® fibers from Honeywell Advanced Fibers of Morristown, N.J. and DYNEEMA® fibers from DSM High Performance Fibers Co. of the Netherlands), melt-spun polyethylene fibers (e.g., CERTRAN® fibers from Celanese Fibers of Charlotte, N.C.), melt-spun nylon fibers (e.g., high tenacity type nylon 6,6 fibers from Invista of Wichita, Kans.), melt-spun polyester fibers (e.g., high tenacity type polyethylene terephthalate fibers from Invista of Wichita, Kans.), and sintered polyethylene fibers (e.g., TENSYLON® fibers from ITS of Charlotte, N.C.). Suitable fibers also include those made from rigid-rod polymers, such as lyotropic rigid-rod polymers, heterocyclic rigid-rod polymers, and thermotropic liquid-crystalline polymers. Suitable fibers made from lyotropic rigid-rod polymers include aramid fibers, such as poly(p-phenyleneterephthalamide) fibers (e.g., KEVLAR® fibers from DuPont of Wilmington, Del. and TWARON® fibers from Teijin of Japan) and fibers made from a 1:1 copolyterephthalamide of 3,4'-diaminodiphenylether and p-phenylenediamine (e.g., TECHNORA® fibers from Teijin of Japan). Suitable fibers made from heterocyclic rigid-rod polymers, such as p-phenylene heterocyclics, include poly(p-phenylene-2,6-benzobisoxazole) fibers (PBO fibers) (e.g., ZYLON® fibers from Toyobo of Japan), poly(p-phenylene-2,6-benzobisthiazole) fibers (PBZT fibers), and poly[2,6-diimidazo[4,5-b: 4',5'-e] pyridinylene-1,4-(2,5-dihydroxy)phenylene] fibers (PIPD fibers) (e.g., M5® fibers from DuPont of Wilmington, Del.). Suitable fibers made from thermotropic liquid-crystalline polymers include poly(6-hydroxy-2-napthoic acid-co-4-hydroxybenzoic acid) fibers (e.g., VECTRAN® fibers from Celanese of Charlotte, N.C.). Suitable fibers also include boron fibers, silicon carbide fibers, alumina fibers, glass fibers, carbon fibers, such as those made from the high temperature pyrolysis of rayon, polyacrylonitrile (e.g., OPF® fibers from Dow of Midland, Mich.), and mesomorphic hydrocarbon tar (e.g., THORNEL® fibers from Cytec of Greenville, S.C.).

In one preferred embodiment, the high modulus fibers 110 of the first layer 100 comprise bast fibers. The term "bast fiber" refers to strong woody fibers obtained from the phloem of plants. Suitable bast fibers include, but are not limited to, jute, kenaf, hemp, flax, ramie, roselle, bamboo and combinations thereof. Other suitable bast fibers include, but are not limited to, leaf fibers (e.g., fibers derived from sisal, banana leaves, grasses (e.g., bamboo), or pineapple leaves), straw fibers (e.g., fibers derived from wheat straw, rice straw, barley straw, or sorghum stalks), bamboo fibers, and husk fibers (e.g., fibers derived from corn husk, bagasse (sugar cane), or coconut husk). In certain embodiments, the bast fiber may be jute. The fiber-containing composite can contain any suitable amount of the bast fiber(s). For example, the bast fibers can comprise about 30 to about 70 wt. %, about 30 to about 60 wt. %, or about 60 wt. % of the total weight of the fiber-containing composite. The bast fibers suitable for use in the disclosed fiber-containing composite and method can have any suitable linear density (i.e., denier). For example, the bast fibers can have a linear density of about 8.8 dtex (8 denier) to about 20 dtex (18 denier).

The binder fibers 120 of the first layer 100 may be any suitable binder material and may be staple or continuous fibers. For example, the binder materials may be thermoplastic materials capable of at least partially melting when heated so that the fibers contained within the composite will be wetted, encapsulated, and bonded together. Suitable thermoplastic binder materials include, but are not limited to, polyesters (e.g., polyethylene terephthalate (PET) or glycol-modified PET (PETG)), polyamides (e.g., nylon 6 or nylon 6,6), polyethylenes (e.g., high density polyethylene (HDPE) or linear low density polyethylene (LLDPE)), polypropylenes, polylactic acid, poly(1,4-cyclohexanedimethylene terephthalate) (PCT), and combinations thereof. Suitable binder fibers 120 also include, but are not limited to, bicomponent binder fibers (e.g., bicomponent binder fibers comprising a thermoplastic sheath) and thermoplastic binder fibers having a relatively low melt flow rate. Suitable bicomponent fibers include bicomponent, sheath-core fibers in which the sheaths have a lower melting point than the cores of the fibers. For example, the bicomponent, sheath-core fiber can have a polyethylene sheath (e.g., a high density polyethylene sheath) and a polypropylene or polyester core. Other suitable bicomponent fibers include fibers having a PET copolymer sheath and a PET core, a PCT sheath and polypropylene core, a PCT sheath and a PET core, a PETG sheath and a PET core, a HDPE sheath and a PET core, a HDPE sheath and a polypropylene core, a LLDPE sheath and a PET core, a polypropylene sheath and a PET core, or a nylon 6 sheath and a nylon 6,6 core. When such fibers are used in the disclosed composite, the composite can be heated so that the sheaths of the bicomponent fibers are melted to provide links between adjacent fibers within the composite, while the cores of the bicomponent fiber retain their fibrous structure. For applications that require a higher service temperature, Poly(p-phenylene sulfide) (PPS), Poly(aryl-ether-ether-ketone) (PEEK) or ULTEM® PolyEtherlmide fibers can be used. When such fibers are used in the disclosed composite, the composite may be heated so that the thermoplastic binder fibers 120 are at least partially melted to provide links between adjacent fibers, while the relatively low melt flow rate of the thermoplastic material allows the binder fibers 120 to retain their fibrous structure. The binder fibers 120 contained in the fiber-containing composite may be of any suitable linear density or combination of linear densities. In certain embodiments, each of the different binder fiber types contained in the composite can have different linear densities. "Fine denier" thermoplastic fibers refer to fibers having a denier less than about 10 denier, in one embodiment. In another embodiment, "Coarse denier" thermoplastic fibers refer to fibers of greater than about 30 denier. In the final composite 10 (once heat and/or pressure is used to at least partially melt the binder fibers), at least a portion of the binder fibers 120 are connected to the high modulus fibers 110.

Referring back to FIG. 1, the second layer 200 is attached to the upper surface 100a of the first layer 100. The second layer 200 contains high modulus fibers 210 and a thermoplastic matrix 220. Preferably, the thickness of the second layer 200 is less than the thickness of the first layer 100. The second layer 200 has a solidity of greater than about 70%, more preferably greater than about 90%, more preferably greater than 95%.

Figure 6:
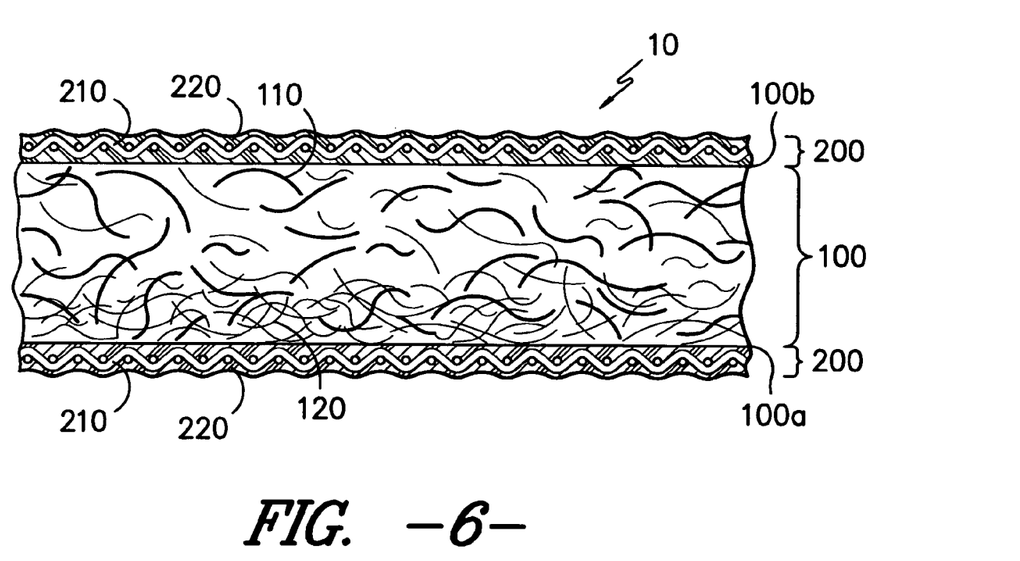
FIG. 6 is a schematic side view of one embodiment of the composite having second layers on both sides of the first layer.
Figure 7:
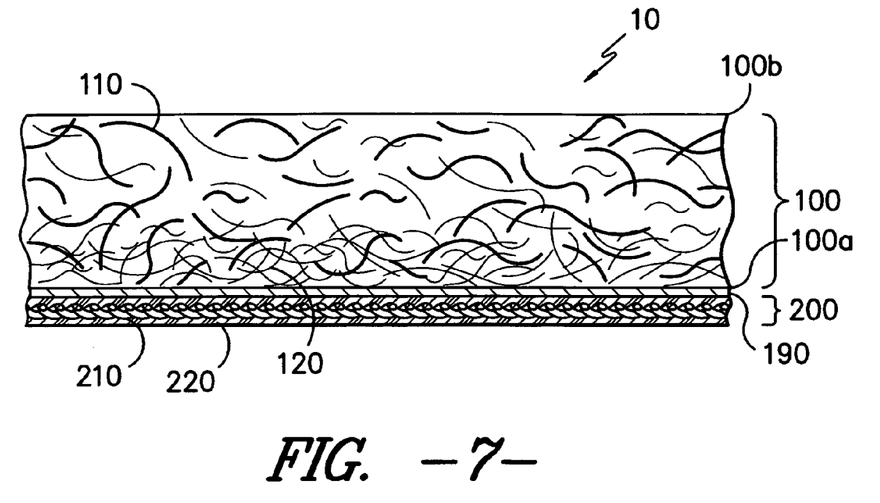
FIG. 7 is a schematic side view of one embodiment of the composite having a tie layer.
Figure 8:
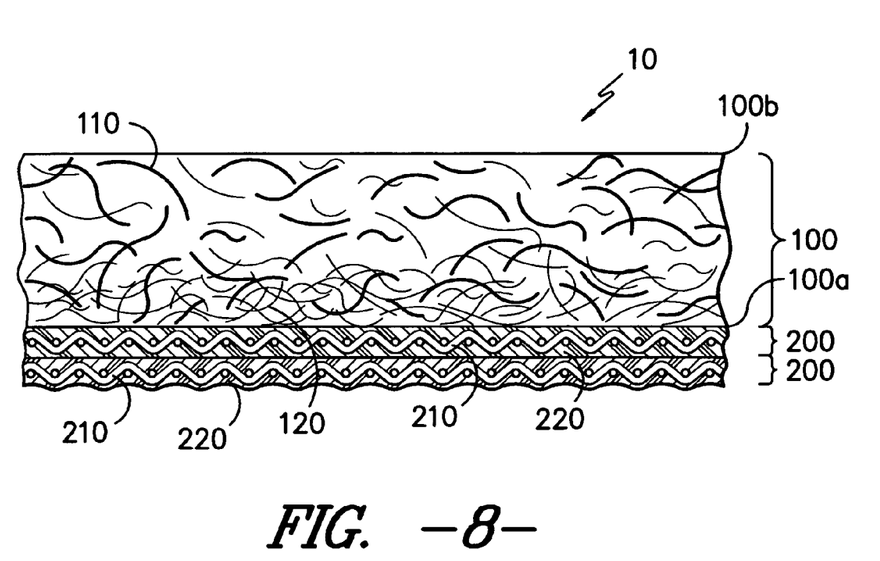
FIG. 8 is a schematic side view of one embodiment of the composite having two second layers on one side of the first layer.
Figure 11:
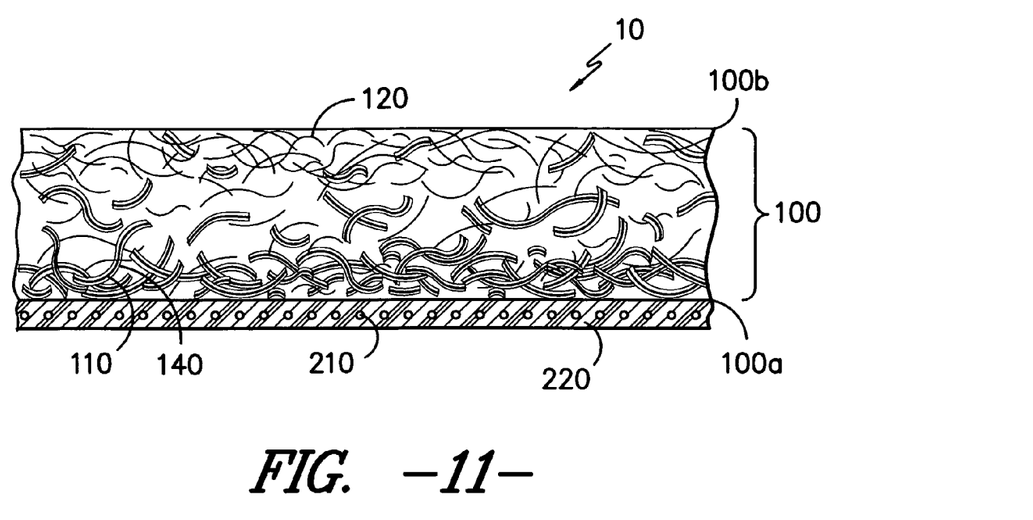
FIGS. 11-12 are schematic side views of embodiments of the composite having an elastomeric resin.
Figure 12:
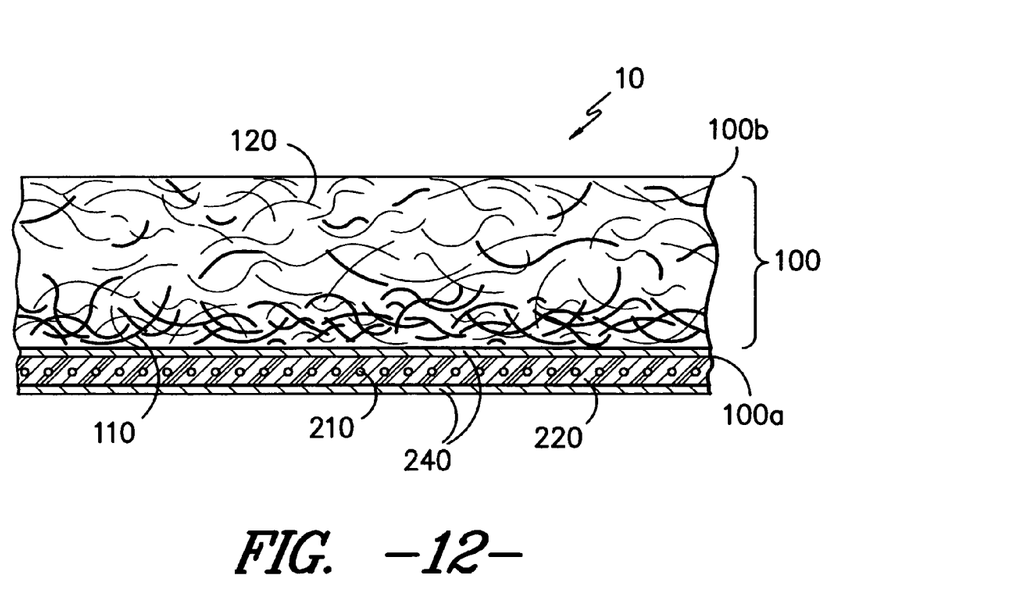

While the high modulus fibers 210 are shown in FIG. 1 as being in a woven construction, the construction may be a woven, knit, unidirectional, or bidirectional (0°/30°/45°/60°/90°) laminate construction. FIG. 7 illustrates the embodiment where the second layer 200 is a knit layer and FIGS. 11 and 12 illustrate the embodiment where the second layer 200 is a unidirectional fiber reinforced laminate layer. Second layer(s) 200 may be located on the upper surface 100a and/or the lower surface 100b of the first layer 100. FIG. 6 illustrates an embodiment where there are second layers 200 located on both the upper surface 100a and lower surface 100b of the first layer 100. In addition, there may be multiple layers of the second layer 200 on a surface of the first layer 100. FIG. 8 illustrates this arrangement where there are two second layers 200 on the upper surface of the first layer 100. While two layers of the second layer 200 are shown, there may be two, three, four, five, etc layers on one or both surfaces of the first layer 100.

The high modulus fibers 210 of the second layer 200 have a modulus of at least about 8 GPa, more preferably at least about 70 GPa and may be selected from the listing of high modulus fibers 110 of the first layer 100, described above. The high modulus fibers 210 of the second layer 200 may be staple or continuous fibers. In one embodiment, the high modulus fibers 210 and the high modulus fibers 110 comprise the same fiber. In another embodiment, the high modulus fibers 210 and 110 are selected such that the high modulus fibers 210 have an equal to or higher modulus than the high modulus fibers 110.

The thermoplastic matrix 220 may be any suitable thermoplastic matrix material. The matrix material covers at least a portion of the surface area of the high modulus fibers 210 and is preferably continuous. Some examples of suitable thermoplastic matrix materials 220 include, but are not limited to polypropylene, polyolefin, polyethylene, polyesters (e.g., polyethylene terephthalate (PET), glycol-modified PET (PETG)), polyamides (e.g., nylon 6 or nylon 6,6), polylactic acid, poly(1,4-cyclohexanedimethylene terephthalate) (PCT), Poly(p-phenylene sulfide). In a preferred embodiment, the thermoplastic binder 220 is polypropylene. In one embodiment, the second layer 200 is a bidirectional (0°/90°) laminate containing continuous E-glass reinforcing fibers in a polypropylene matrix. It is advantageous to select the thermoplastic matrix 220 of the second layer 200 which is thermodynamically compatible with the binder fibers 120 of the first layer 100 which allows both the first 100 and second layers 200 to be processed under the same conditions of temperature and pressure. In one embodiment of the final composite 10, the binder fibers 120 of the first layer 100 are adhered to the thermoplastic matrix 220 of the second layer 200. Preferably, the melting temperatures of the binder fibers 120 in the first layer 100 and the thermoplastic matrix 220 of the second layer 200 are within 30° F. of each other. In one embodiment, the high modulus fibers 210 are approximately 60 to 80% wt of the second layer 200 with the remainder being thermoplastic matrix 220.

Figure 9:
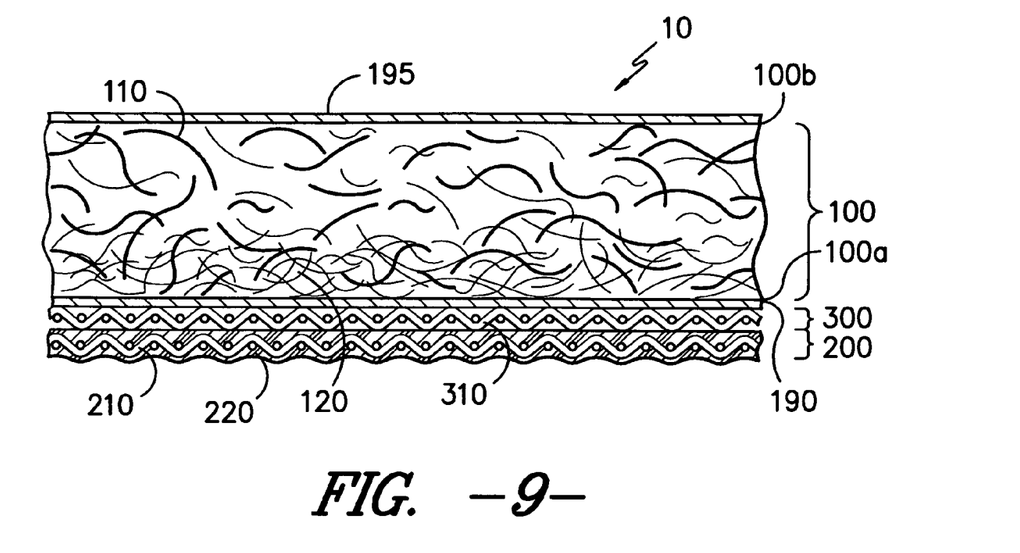
FIGS. 9-10 are schematic side views of embodiments of the composite having a third layer.
Figure 10:
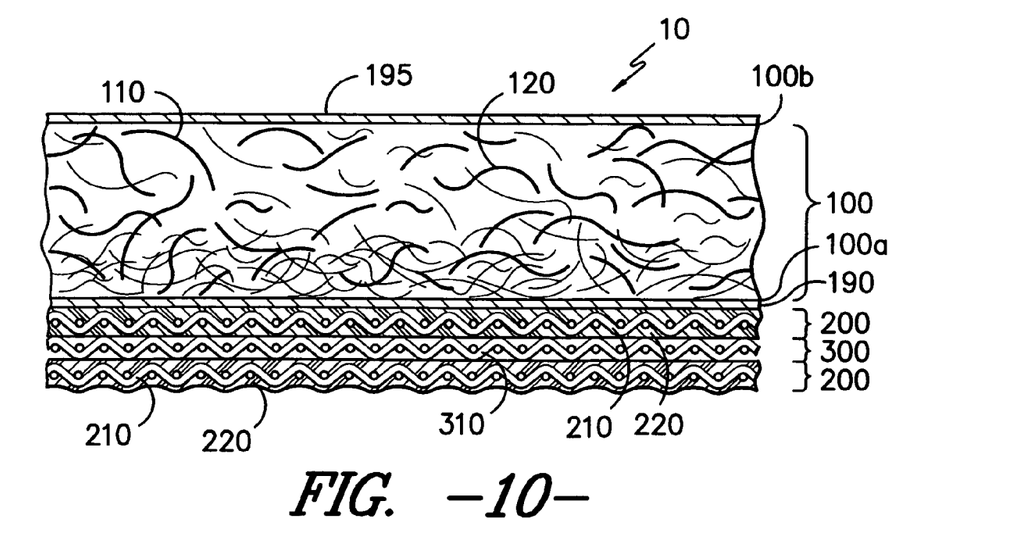

In some embodiments, such as shown in FIGS. 7, 9, and 10, there is a tie-layer 190 used to adhere the first layer 100 and the second layer 200 together. A tie layer 190 may also be used to attach second layers 200 to additional second layers 200 or first 100 and/or second layers 200 to additional third or fourth layers. The tie-layer 190 may be a continuous or discontinuous layer. The tie-layer may be a monolayer or multilayer film, adhesive scrim, powder coated or printed adhesive and may be applied to the layers 100, 200 in any known means. The tie layer may be a pressure sensitive adhesive, or may be activated by UV, heat, or other activation methods. In a preferred embodiment, the tie-layer 190 is a multi-layer extruded polymeric film wherein one of the layers is thermodynamically compatible with the thermoplastic binder fibers used in the first layer 100, and the other layer is thermodynamically compatible with the thermoplastic matrix used in the second layer 200. In another preferred embodiment, the tie-layer is a polymeric material that contains functional groups grafted onto a thermoplastic polymer that is thermodynamically compatible with the binder fibers used in the first layer 100, wherein the functional groups facilitate bonding with the thermoplastic matrix in the second layer 200 via attractive interactions or formation of chemical bonds. The composition of the tie-layer allows the first and second layers to be consolidated simultaneously.

In some embodiments, an abrasion resistant coating 195 is applied to the composite 10. The abrasion resistant coating 195 is typically applied to the first layer 100 or the second layer 200, but may be applied to any layer of the composite that forms an outer surface of the composite 10. The composite 10 with the abrasion resistant coating 195 when tested in accordance with the Taber Abrasion Resistance Test (H-18 wheel and 500 gram weight) retains at least 98% of its original weight after 1000 abrasion cycles. In this test, two rollers coated with abrasive paper abrade the surface of a rotating test specimen. The friction causes the material to abrade. The magnitude of abrasion is determined by the size of the abrasive particles used and the normal force exerted by the wheels on the test specimen. The abrasion resistant coating 195 provides the composite 10 the ability to withstand mechanical action such as rubbing, scraping, or erosion that tends to progressively remove material from its surface. In the preferred embodiment, powder coatings, films or paints containing abrasion resistant materials such as polyester, polyurethane, polycarbonate, ionomer thermoplastic resins (e.g. SURLYN® grades from DuPont), polyamides can be used. Frictional abrasion can be reduced by incorporating finely powdered internal lubricants like Teflon® PTFE, molybdenum sulphide or graphite in the base resin matrix. Some examples of abrasion resistant resin grades commercially available from DuPont are Delrin® acetal resin, Hytrel® thermoplastic polyester, Zytel® ST super-tough nylon, Vespel® SP polyimides and Teflon® polytetrafluoroethylene. In one preferred embodiment, an aluminum sheet may be used as the abrasion resistant layer 195 which can be laminated onto the first layer 100 or the second layer 200 to provide a conducting surface for powder coating additional layers of abrasion resistant or UV resistant materials. The aluminum sheet would also improve the fire resistant properties (especially in a horizontal burn test) of the composite 10 by reflecting and dissipating heat and avoiding localized hot spots. The abrasion resistant layer 195 can either be laminated, powder coated, sprayed with a cup gun or painted onto the composite 10.

Referring now to FIG. 9 there is shown an embodiment of the composite 10 having a third layer 300 on the upper surface of the first layer 100 located between the first layer 100 and a second layer 200. FIG. 10 shows an embodiment of the composite 10 having a third layer located between two second layers 200. The third layer 300 may also be located on a second layer 200 forming the outer surface of the composite 10 or between additional layers of 200. The third layer may contain a resiliently stretchable, elastic or visco-elastic material. This third layer 300 in one embodiment may be a nonwoven, woven or knit layer without any resin (resin free) or thermoplastic matrix such as shown in FIGS. 9 and 10. This nonwoven, woven or knit layer may be composed of any suitable fibers, preferably high modulus fibers. These high modulus fibers may be the same fibers as described above in relation to high modulus fibers 110 in the first layer 100. In another embodiment, the third layer 300 can contain a nonwoven material with compression resistant hexagonal cell structures (e.g. Lantor Soric). These pressure-resistant cells are separated by channels containing synthetic microspheres. Since these cells are pressure resistant, they create thickness in the laminate even when pressure is applied during compression. In another embodiment, the third layer 300 can contain an energy absorbing cellular foam material. In another embodiment, the third layer 300 can contain a multiaxial fabric comprising non-crimped reinforcing E-glass fibers (e.g. VECTORPLY). The addition of the third layer 300 allows the high stresses induced during an impact event to be more evenly distributed across the composite surface instead of localizing it around the impact zone. Also, the third layer 300 helps composite 10 to continue absorbing significant energy beyond its "yield" point in an impact event, thereby avoiding catastrophic failure. In another embodiment, the third layer 300 is selected from the group consisting of woven high modulus fibers, multiaxial non-crimp high modulus fiber reinforcement, interconnected compression resistant nonwoven cells, thermoplastic elastomer, thermoplastic rubber, thermoplastic films with or without impact modifiers, 2D and 3D cellular solids, thermoplastic films with impact modifiers, spunbond scrims, and energy-absorbing foam.

In one embodiment, the first 100 and/or second 200 layer may contain an elastomeric resin. By the term "elastomeric resin", thermoplastic rubber is considered an elastomeric resin. The elastomeric resin may coat individual fibers, be a discontinuous or continuous matrix within the layer, or a coating at least partially surrounding a layer. FIG. 11 illustrates one embodiment where at least a portion of the high modulus fibers 110 of the first layer 100 are coated with an elastomeric resin 140. FIG. 12 illustrates another embodiment where an elastomeric resin coating 240 at least partially surrounds the second layer 200.

The elastomeric resin is incorporated into the composite to improve impact properties. For example, one material potentially used as the binder fibers 120 and the thermoplastic matrix 220 is polypropylene (PP) which has poor impact properties, especially at low temperatures. The impact properties of PP or other polymers used in the composite 10 can be improved through the use of block copolymers of polypropylene, addition of elastomeric resins, or with copolymerization with ethylene. Thermoplastic olefin (TPOs) generally refers to polymer/filler blends usually consisting of some fraction of PP (polypropylene), elastic ethylene copolymer, BCPP (block copolymer polypropylene), rubber, and reinforcing filler. Common rubbers that also act as good impact modifiers include EPR (ethylene-propylene rubber), EPDM (EP-diene rubber), EO (ethylene-octene), EB (ethylene-butadiene), SEBS (Styrene-ethylene-butadiene-styrene). Blends with 10-40% elastomers are usually called "impact polypropylenes"; the elastomeric phase being dispersed in the polymer matrix. Elastomer domain size and distribution also have an effect on the impact properties of PP. Uniform distribution and small domains, <1 μm, are expected to improve the impact properties of PP and other polymers. In general, small particles are more effective in toughening the thermoplastic matrix 220 than larger particles. In another preferred embodiment, ground-up recycled rubber, buna-N/nitrile rubber, butyl rubber, hypalon rubber, natural rubber, polybutadiene, polyisoprene, neoprene rubber, silicone rubber, or vinyl rubber is impregnated into the first 100 or second 200 layers. In another preferred embodiment, a tri-block copolymer of the type $(AB)_n$ (n=2-10) or a radial configuration copolymer of the type $Rx(BA)_x$ (x=3-150), wherein A is a block from a polyvinyl aromatic monomer and B is a block from a conjugated diene elastomer is impregnated into the first layer 100 or second 200 layer. Such a preferred thermoplastic matrix polymer comprising styrenic block copolymers is commercially available from KRATON® Polymers (Houston, Tex.). Aqueous dispersions of elastomeric rubber are commercially available under the Tradename PRINLIN® (KRATON rubber dispersions, Henkel) and VECTOR (triblock copolymer of styrene and isoprene). The elastomeric layer provides composite 10 with a resiliently stretchable, viscoelastic matrix capable of absorbing shock during an impact event.

In one embodiment, the composite 10 may be formed in separate layers then compressed using heat and/or pressure to consolidate all of the layers together and form the final composite 10. In another embodiment, each of the layers may be stacked together and consolidated at the same time. When consolidation occurs at the same time for all layers, it is advantageous to have the melting component (binder fibers 120, thermoplastic matrix 220, etc) have approximately similar melting temperatures. In another embodiment, come layers may be partially consolidated to make handling easier as the layers are conveyed and stacked.

EXAMPLES

Each of the Examples used a nonwoven layer having a functional fiber density gradient as the first layer 100. The Examples varied as to the additional second and third layers that were applied to the first layer 100.

First Layer

The first layer was produced by air laying a fiber blend using a K-12 HIGH-LOFT RANDOM CARD by Fehrer AG (Linz, Austria). In particular, a fiber blend containing approximately 45 wt. % (based on the total weight of the fiber blend) of thermoplastic binder fibers and approximately 55 wt. % of kenaf fibers, which had a linear density of approximately 8-18 denier was used. The binder fibers were polypropylene binder fibers containing polypropylene that had been grafted with approximately 10 wt. % maleic anhydride (MAH). The binder fiber content was comprised of four binder fibers having four different linear densities. The first binder fibers, which comprised approximately 15 wt. % of the total weight of the fiber blend, had a linear density of approximately 1.5 denier. The second binder fibers, which comprised approximately 10 wt. % of the total weight of the fiber blend, had a linear density of approximately 10 denier. The third binder fibers, which comprised approximately 10 wt. % of the total weight of the fiber blend, had a linear density of approximately 30 denier. The fourth binder fibers, which comprised approximately 10 wt. % of the total weight of the fiber blend, had a linear density of approximately 70 denier. The above described fiber blend was air-laid onto a moving belt. Due to the difference in denier between the fibers contained in the fiber blend, the K-12 machine produces a functionally graded composite mat that contains a greater concentration of the 1.5 denier binder fiber on the side closest to the collection belt, a greater concentration of the 10 denier and 30 binder fibers in a middle region, and a greater concentration of the 70 denier binder fiber in an upper region. Due to the polydispersity of the kenaf fibers, they are non-uniformly distributed across the thickness of the substrate. Following the air laying step, the resulting composite was passed through a through-air oven in which air heated to a temperature of approximately 175° C. (347° F.) was passed through the composite to partially melt the binder fibers and form the first layer which had an areal density of 2000 gram/m$^2$.

Example 1

Two (2) layers of POLYSTRAND® IE7033X available from Polystrand Inc. (Montrose, Colo.), were applied to both the upper and lower surfaces of the first layer (for a total of 4 layers of IE7033X). POLYSTRAND® IE7033X is a 0°/90° cross-ply bidirectional laminate containing 70 wt % continuous E-glass structural reinforcing fibers in a co-polymer polypropylene matrix. The areal density of a single layer of POLYSTRAND® IE7033X was 660 gram/m$^2$. The composite was consolidated to a thickness of 5.6 mm using a platen press set at 193° C. (380° F.). The sample was allowed to cool to 100° F. while still under pressure before it was removed.

Example 2

Three (3) layers of POLYSTRAND® IE7033X were applied to both the upper and lower surfaces of the first layer (for a total of 6 layers of IE7033X). The composite was consolidated to a thickness of 5.2 mm using a platen press set at 193° C. (380° F.). The sample was allowed to cool to 100° F. while still under pressure before it was removed.

Example 3

One (1) layer of POLYSTRAND® IE7032T available from Polystrand Inc. (Montrose, Colo.), was applied to both the upper and lower surfaces of the first layer (for a total of 2 layers of IE7032T). POLYSTRAND® IE7032T is 0°/90°/0° bidirectional laminate containing 70 wt % continuous E-glass structural reinforcing fibers in a co-polymer polypropylene matrix. The areal density of a single layer of POLYSTRAND® IE7032T was 1240 gram/m$^2$. The composite was consolidated to a thickness of 5.3 mm using a platen press set at 193° C. (380° F.). The sample was allowed to cool to 100° F. while still under pressure before it was removed.

Example 4

Two (2) layers of POLYSTRAND® IE7032T were applied to both the upper and lower surfaces of the first layer (for a total of 4 layers of IE7032T). The composite was consolidated to a thickness of 5.4 mm using a platen press set at 193° C. (380° F.). The sample was allowed to cool to 100° F. while still under pressure before it was removed.

Example 5

Two (2) layers of POLYSTRAND® IE7033X were applied to both the upper and lower surfaces of the first layer (for a total of 4 layers of IE7033X). Each layer of POLYSTRAND® IE7033X was coated with a commercially available elastomeric dispersion available from 3M Inc. under the Trademark SCOTCH-GRIP® 4693. The elastomeric dispersion consisted of about 10% styrene butadiene copolymer, about 10% polyterpene and about 10% polydipentene in about 10% acetone and about 60% cyclohexane. The total add-on to the POLYSTRAND® IE7033X layers was about 5% wt (measured after the evaporation of solvent). The composite was consolidated to a thickness of 5 mm using a platen press set at 193° C. (380° F.). The sample was allowed to cool to 100° F. while still under pressure before it was removed.

Example 6

Two (2) layers of POLYSTRAND® IE7033X were applied to both the upper and lower surfaces of the first layer (for a total of 4 layers of IE7033X) with a layer of LANTOR SORIC® XF sandwiched between the POLYSTRAND® IE7033X layers. The structure of the multi-layer composite was as follows:

IE7033X/Lantor Sonic/IE7033X/First Layer/IE7033X/Lantor Sonic/IE7033X

LANTOR SORIC® XF is a polyester nonwoven with a compression resistant hexagonal cell structure available from LANTOR® BV (The Netherlands). A single layer of LANTOR SORIC® XF had a thickness of 3 mm and an areal density of 190 gram/m². The composite was consolidated to a thickness of 5.3 mm using a platen press set at 193° C. (380° F.). The sample was allowed to cool to 100° F. while still under pressure before it was removed.

Example 7

Two (2) layers of POLYSTRAND® IE7033X were applied to both the upper and lower surfaces of the first layer (for a total of 4 layers of IE7033X) with a layer of VECTORPLY® E-BX 1200 double bias (+45°/−45°) E-glass reinforcement fabric (with no resin) sandwiched between the POLYSTRAND® IE7033X layers. A single layer of VECTORPLY® E-BX 1200 had a thickness of 0.4 mm and an areal density of 425 gram/m². The structure of the multi-layer composite was as follows:

IE7033X/E-BX 1200/IE7033X/First Layer/IE7033X/E-BX 1200/IE7033X

The composite was consolidated to a thickness of 4.9 mm using a platen press set at 193° C. (380° F.). The sample was allowed to cool to 100° F. while still under pressure before it was removed.

Example 8

Two (2) layers of POLYSTRAND® IE7033X were applied to both the upper and lower surfaces of the first layer (for a total of 4 layers of IE7033X) having a thermoplastic rubber layer sandwiched between the POLYSTRAND® IE7033X layers. The structure of the multi-layer composite was as follows:

IE7033X/rubber/IE7033X/First Layer/IE7033X/rubber/IE7033X

The thermoplastic rubber layer used was a military specification EPDM (Ethylene Propylene Diene Monomer) sheet available from Grainger (Item No. 3TED3). The rubber sheet had a thickness of 0.8 mm and a Durometer rating of 85A. The composite was consolidated to a thickness of 5.5 mm using a platen press set at 187° C. (370° F.). The sample was allowed to cool to 100° F. while still under pressure before it was removed.

Example 9

Three (3) layers of POLYSTRAND® IE7033X were applied to both the upper and lower surfaces of the first layer (for a total of 6 layers of IE7033X) having a thermoplastic rubber layer sandwiched between the second and third IE7033X layers and an additional rubber layer above the third IE7033X layer. The structure of the multi-layer composite was as follows:

Rubber/IE7033X/rubber IE7033X/IE7033X/First Layer/IE7033X/IE7033X/rubber/IE7033X/rubber The thermoplastic rubber layer used was a military specification EPDM (Ethylene Propylene Diene Monomer) sheet available from Grainger (Item No. 3TED1). The rubber sheet had a thickness of 0.4 mm and a Durometer rating of 85A. The composite was consolidated to a thickness of 5.5 mm using a platen press set at 187° C. (370° F.). The sample was allowed to cool to 100° F. while still under pressure before it was removed.

Example 10

Two (2) layers of POLYSTRAND® IE7033X were applied to both the upper and lower surfaces of the first layer (for a total of 4 layers of IE7033X) having a thermoplastic film layer sandwiched between the POLYSTRAND® IE7033X layers. The structure of the multi-layer composite was as follows:

IE7033X/film/IE7033X/First Layer/IE7033X/film/IE7033X

The film was cast from a thermoplastic resin commercially available from Evonik Degussa under the Trademark VESTOPLAST® 792. VESTOPLAST® 792 is a high viscous grade amorphous polyalphaolefin with very good tear strength and elongation at break. The film had a softening point of 108° C. and had an areal density of 300 gram/m². The composite was consolidated to a thickness of 5.3 mm using a platen press set at 193° C. (380° F.). The sample was allowed to cool to 100° F. while still under pressure before it was removed.

Example 11

Two (2) layers of POLYSTRAND® IE7033X were applied to both the upper and lower surfaces of the first layer (for a total of 4 layers of IE7033X). On the surface of one side of the composite (on an IE7033X layer) an abrasion resistant layer was added. The abrasion resistant layer was a cast film of a thermoplastic resin commercially available from DuPont under the Trademark SURLYN® 8528. SURLYN® 8528 is an advanced ethylene/methacrylic acid (E/MAA) copolymer, in which the MAA groups have been partially neutralized with sodium ions. The amount of sodium ions and neutralization levels in this grade result in excellent abrasion resistance (600NBS index measured using ASTM D1630). The melting temperature of SURLYN® 8528 was 199° F. and the Vicat softening point was 199° F. The areal density of the SURLYN® 8528 film used was 150 gram/m². The composite was consolidated to a thickness of 5 mm using a platen press set at 193° C. (380° F.). The sample was allowed to cool to 100° F. while still under pressure before it was removed.

Example 12

Two (2) layers of POLYSTRAND® IE7033X were applied to both the upper and lower surfaces of the first layer (for a total of 4 layers of IE7033X). The composite was consolidated to a thickness of 5 mm using a platen press set at 193° C. (380° F.). The sample was allowed to cool to 100° F. while still under pressure before it was removed. On the surface of one side of the composite (on an IE7033X layer) an abrasion resistant layer was added. The abrasion resistant layer was a gel coat commercially available from Fibre Glast Developments Corporation (product name: #182 white gel coat). The gel coat was activated with 1.5 wt % Methyl Ethyl Ketone Peroxide (MEKP) to initiate cross-linking and sprayed un-thinned onto the composite using a cup gun. The gel time at 77° F. was 8-12 minutes and the film cure time was 40 minutes. The gel coat was 4% of the overall composite weight and had excellent crack, tear, and chemical resistance and UV light stability.

Example 13

Two (2) layers of POLYSTRAND® IE7033X were applied to both the upper and lower surfaces of the first layer (for a total of 4 layers of IE7033X). The composite was consolidated to a thickness of 5 mm using a platen press at 193° C. (380° F.). The sample was allowed to cool to 100° F. while still under pressure before it was removed. On the surface of one side of the composite (on an IE7033X layer) a UV resistant film layer was added. The resultant structure of the multilayer composite was as follows:

IE7033X/IE7033X/First Layer/IE7033X/IE7033X/UV resistant layer

The UV resistant film layer was formed by powder coating a polyester powder commercially available from Eastwood Company (Hotcoat powder off white, Item #10135) that contained 1-35 wt % Titanium Dioxide for UV light stability. A Hotcoat electrostatic powder coating kit was used to get a uniform coat on the composite surface. The powder coated layer was then cured in the oven at 375° F. and comprised about 2% by weight of the overall composite. The UV resistant layer was found to have good abrasion resistance as well.

Testing

Each of the Examples was subjected to a three-point flexural testing according to ASTM D790 and multiaxial impact testing according to ASTM D3763. The properties of the composite in the machine (MD) and cross machine (CD) direction were measured. The results are summarized below in Table 1.

| | Thickness (mm) | | three-point flexural testing (ASTM D790) | | | | | | multiaxial impact testing (ASTM D3763) Energy absorbed |
|---|---|---|---|---|---|---|---|---|---|
| | | | Flexural Modulus (MPa) | | Peak Load (N) | | Toughness (%) | | |
| Example | CD | MD | CD | MD | CD | MD | CD | MD | (Joules) |
| 1 | 5.64 | 5.64 | 12157 | 11495 | 1387 | 1535 | 42 | 47 | 58 |
| 2 | 5.21 | 5.16 | 14669 | 14843 | 1894 | 1914 | 71 | 76 | 81 |
| 3 | 5.31 | 5.34 | 14296 | 8609 | 1357 | 1118 | 38 | 61 | 61 |
| 4 | 5.43 | 5.42 | 19956 | 11600 | 2726 | 1699 | 65 | 49 | 94 |
| 5 | 4.80 | 4.80 | — | — | — | — | — | — | 60 |
| 6 | 5.28 | 5.31 | 7962 | 7400 | 897 | 896 | 88 | 113 | 72 |
| 7 | 4.90 | 4.97 | 13861 | 12908 | 923 | 845 | 118 | 94 | 81 |
| 8 | 5.48 | 5.48 | — | — | — | — | — | — | 76 |
| 9 | 5.45 | 5.45 | — | — | — | — | — | — | 74 |
| 10 | 5.30 | 5.30 | — | — | — | — | — | — | 74 |

As can be seen from the data in Table 1, the composite of the Examples provide a light-weight moldable, stiff, impact and abrasion resistant material that could be used in truck trailer scuff liners, automotive interior and exterior components, hard floors and other applications.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A composite comprising:
    a first layer having an upper surface and a lower surface, wherein the first layer is a nonwoven layer comprising high modulus fibers having a modulus of at least 8 GPa and thermoplastic binder fibers, wherein at least a portion of the high modulus fibers are connected to the binder fibers, and wherein the first layer has a solidity of between about 10 and 90%; and,
    a second layer on the upper surface of the first layer, wherein the second layer is a textile layer selected from the group consisting of a knit layer, a woven layer, bidirectional laminates, and a unidirectional layer, wherein the second layer comprises high modulus fibers having a modulus of at least 8 GPa in a thermoplastic matrix.

2. The composite of claim 1, wherein the first layer is a unitary material having:
    a first planar zone defined by a first boundary plane and an inner boundary plane, the first planar zone including a portion of the binder fibers and the high modulus fibers;

a second planar zone defined by a second boundary plane and the inner boundary plane, the second planar zone including a portion of the binder fibers and the high modulus fibers;

wherein concentrations of the binder fibers in the first planar zone being greater than concentrations of the binder fibers in the second planar zone, and the concentration of the binder fibers decreases in a gradient from the first boundary plane to the inner boundary plane.

3. The composite of claim 1, wherein the first layer is a unitary material having:

a first planar zone defined by a first boundary plane and an inner boundary plane, the first planar zone including a portion of the binder fibers and the high modulus fibers;

a second planar zone defined by a second boundary plane and the inner boundary plane, the bulking second planar zone including a portion of the binder fibers and the high modulus fibers;

wherein concentrations of the high modulus fibers being greater in the second planar zone than the concentration of the high modulus fibers in first planar zone, and the concentration of high modulus fibers decreases in a gradient from the second boundary plane to the inner boundary plane.

4. The composite of claim 1, wherein the first layer is a unitary material having:

a first planar zone defined by a first boundary plane and an inner boundary plane, the first planar zone including a portion of the binder fibers and the high modulus fibers;

a second planar zone defined by a second boundary plane and the inner boundary plane, the second planar zone including a portion of the binder fibers and the high modulus fibers;

wherein concentrations of the binder fibers in the first planar zone being greater than concentrations of the binder fibers in the second planar zone, and the concentration of the binder fibers decreases in a gradient from the first boundary plane to the inner boundary plane; and, wherein concentrations of the high modulus fibers being greater in the second planar zone than the concentration of the high modulus fibers in the first planar zone, and the concentration of high modulus fibers decreases in a gradient from the second boundary plane to the inner boundary plane.

5. The composite of claim 1, wherein the first layer is a unitary material further comprising additional second binder fibers having:

a first planar zone defined by a first boundary plane and an inner boundary plane, the first planar zone including a portion of the binder fibers, second binder fibers and the high modulus fibers;

a second planar zone defined by a second boundary plane and the inner boundary plane, the second planar zone including a portion of the binder fibers, the second binder fibers, and the high modulus fibers;

wherein concentrations of the binder fibers in the first planar zone being greater than concentrations of the binder fibers in the second planar zone, and the concentration of the binder fibers decreases in a gradient from the first boundary plane to the inner boundary plane; and, wherein concentrations of the second binder fibers being greater in the second planar zone than the concentration of the second binder fibers in first planar zone, and the concentration of second binder fibers decreases in a gradient from the second boundary plane to the inner boundary plane.

6. The composite of claim 1, wherein the binder fibers of the first layer are adhered to the thermoplastic matrix of the second layer.

7. The composite of claim 1, further comprising additional textile layers on the upper surface of the first layer.

8. The composite of claim 1, wherein the high modulus fibers of the second layer have a higher modulus than the high modulus fibers of the first layer.

9. The composite of claim 1, further comprising an additional textile layer located on the lower surface of the first layer.

10. The composite of claim 1, wherein the thermoplastic matrix of the second layer is continuous.

11. The composite of claim 1, further comprising an abrasion resistant layer on the second layer on the side of the second layer opposite to the first layer, wherein when tested in accordance with the Taber Abrasion Resistance Test (H-18 wheel and 500 gram load) the composite in claim 1 retains at least about 98 percent of its original weight after 1000 abrasion cycles.

12. The composite of claim 1, wherein the composite further comprises an additional textile layer located on the original second layer on the side opposite the first layer, and wherein the composite further comprises a third layer located between the two second layers.

13. The composite of claim 12, wherein the third layer is selected from the group consisting of woven high modulus fiber, multiaxial non-crimp high modulus fiber reinforcement, interconnected compression resistant nonwoven cells, thermoplastic elastomer, thermoplastic rubber, 2D and 3D cellular solids, thermoplastic films with impact modifiers, spunbond scrims, and energy-absorbing foam.

14. A composite comprising:

a first layer having an upper surface and a lower surface, wherein the first layer is a nonwoven layer comprising high modulus fibers having a modulus of at least 8 GPa, thermoplastic binder fibers, and an elastomeric matrix, wherein at least a portion of the high modulus fibers are connected to the binder fibers, and wherein the first layer has a solidity of between about 10 and 90%; and, a second layer on the upper surface of the first layer, wherein the second layer is a textile layer selected from the group consisting of a knit layer, a woven layer, bidirectional laminates, and a unidirectional layer, wherein the second layer comprises high modulus fibers having a modulus of at least 8 GPa in a thermoplastic matrix.

15. The composite of claim 14, wherein the first layer comprises approximately 20 to 80% wt high modulus fibers, approximately 15 to 60% wt binder fibers, and approximately 5 to 20% wt elastomeric matrix.

16. The composite of claim 14, wherein the second layer further comprises an elastomeric resin.

17. The composite of claim 14, further comprising an additional textile layer located on the lower surface of the first layer.

18. A composite comprising:

a first layer having an upper surface and a lower surface, wherein the first layer is a nonwoven layer comprising high modulus fibers having a modulus of at least 8 GPa and thermoplastic binder fibers, wherein at least a portion of the high modulus fibers are connected to the binder fibers, and wherein the first layer has a solidity of between about 10 and 90%; and, a second layer on the upper surface of the first layer, wherein the second layer is a textile layer selected from the group consisting of a knit layer, a woven layer, bidirectional laminates, and a unidirectional layer, wherein the second layer comprises high modulus fibers having a modulus of at least 8 GPa in a matrix comprising a thermoplastic resin and an elastomeric resin.

19. The composite of claim 18, wherein the high modulus fibers of the second layer are at least partially encapsulated by the elastomeric resin.

20. The composite of claim 18, wherein the elastomeric resin at least partially forms the outer surface of the second layer.

21. The composite of claim 18, wherein the first layer further comprises an elastomeric resin.

22. The composite of claim 18, further comprising an additional textile layer located on the lower surface of the first layer.

* * * * *

UNITED STATES PATENT AND TRADEMARK OFFICE
CERTIFICATE OF CORRECTION

PATENT NO. : 8,298,969 B2  
APPLICATION NO. : 12/583352  
DATED : October 30, 2012  
INVENTOR(S) : Pradip Bahukudumbi Page 1 of 1

It is certified that error appears in the above-identified patent and that said Letters Patent is hereby corrected as shown below:

In column 15, line 17, after the word "the" delete the word "bulking".

Signed and Sealed this  
Twenty-second Day of January, 2013

David J. Kappos  
*Director of the United States Patent and Trademark Office*